(12) United States Patent
Hsu

(10) Patent No.: US 9,154,759 B2
(45) Date of Patent: Oct. 6, 2015

(54) APPARATUS AND METHOD FOR WHITE BALANCE COMPENSATION OF PIXEL DATA

(75) Inventor: Wei Hsu, Taoyuan County (TW)

(73) Assignee: NOVATEK MICROELECTRONICS CORP., Hsinchu (TW)

( * ) Notice: Subject to any disclaimer, the term of this patent is extended or adjusted under 35 U.S.C. 154(b) by 79 days.

(21) Appl. No.: 13/592,825

(22) Filed: Aug. 23, 2012

(65) Prior Publication Data

US 2013/0182142 A1 Jul. 18, 2013

(30) Foreign Application Priority Data

Jan. 18, 2012 (TW) .............................. 101102027 A

(51) Int. Cl.
- H04N 5/228 (2006.01)
- H04N 9/73 (2006.01)
- H04N 3/14 (2006.01)
- H04N 5/335 (2011.01)
- H04N 5/213 (2006.01)

(52) U.S. Cl.
CPC ................. H04N 9/73 (2013.01); H04N 5/213 (2013.01); H04N 9/735 (2013.01)

(58) Field of Classification Search
CPC .............. H04N 9/735; H04N 13/0025; H04N 13/0239; H04N 13/025
USPC .......................... 348/222.1–225.1, 294–324
See application file for complete search history.

(56) References Cited

U.S. PATENT DOCUMENTS

| | | | |
|---|---|---|---|
| 5,909,244 A * | 6/1999 | Waxman et al. ............ | 348/222.1 |
| 8,248,483 B2 * | 8/2012 | Ezawa et al. ............... | 348/222.1 |
| 8,537,233 B1 * | 9/2013 | Li ............................... | 348/222.1 |
| 8,659,675 B2 * | 2/2014 | Takahashi et al. ......... | 348/224.1 |
| 2001/0019361 A1* | 9/2001 | Savoye ......................... | 348/222 |
| 2005/0052547 A1* | 3/2005 | Minakuti et al. ........... | 348/224.1 |
| 2006/0221216 A1* | 10/2006 | Hattori .......................... | 348/254 |
| 2006/0227209 A1* | 10/2006 | Takayama .................... | 348/53 |
| 2007/0058965 A1* | 3/2007 | Kaikumaa ..................... | 396/153 |
| 2009/0015689 A1* | 1/2009 | Murayama .................. | 348/229.1 |
| 2009/0140125 A1* | 6/2009 | Takayama ................... | 250/214 R |

(Continued)

FOREIGN PATENT DOCUMENTS

| | | | | |
|---|---|---|---|---|
| CN | 101204085 A | | 6/2008 | |
| JP | 2002247410 A | * | 8/2002 | ............... H04N 5/20 |

OTHER PUBLICATIONS

Chinese Office Action dated Jul. 3, 2015.

*Primary Examiner* — Chia-Wei A Chen

(74) *Attorney, Agent, or Firm* — Rabin & Berdo, P.C.

(57) ABSTRACT

An image processing apparatus and an image processing method are provided. The image processing apparatus includes a sample unit, an amplifier, an analog to digital converter, and a white balance unit. The sample unit is for sampling a pixel to obtain a pixel voltage. The amplifier is for amplifying the pixel voltage according to an analog gain. The analog to digital converter is for converting the amplified pixel voltage into digital pixel data, the digital pixel data including a number of first sub-pixel data which are corresponding to different colors. The white balance unit is for obtaining a number of second of sub-pixel data from white balance compensating the first sub-pixel data. The first sub-pixel data are white balance compensated respectively according to the analog gain and a number of white balance gains which are corresponding to different sub-pixels.

34 Claims, 3 Drawing Sheets

(56) References Cited

U.S. PATENT DOCUMENTS

| | | | |
|---|---|---|---|
| 2009/0297022 A1* | 12/2009 | Pettigrew et al. | 382/162 |
| 2010/0238335 A1* | 9/2010 | Sakurai | 348/308 |
| 2011/0032401 A1* | 2/2011 | Nikai | 348/294 |
| 2011/0090240 A1* | 4/2011 | Cohen | 345/589 |
| 2012/0086843 A1* | 4/2012 | Koizumi et al. | 348/308 |
| 2012/0187190 A1* | 7/2012 | Wang et al. | 235/462.06 |
| 2012/0274798 A1* | 11/2012 | Takahashi et al. | 348/222.1 |
| 2013/0070130 A1* | 3/2013 | Alakarhu et al. | 348/256 |

* cited by examiner

APPARATUS AND METHOD FOR WHITE BALANCE COMPENSATION OF PIXEL DATA

This application claims the benefit of Taiwan application Serial No. 101102027, filed Jan. 18, 2012, the subject matter of which is incorporated herein by reference.

BACKGROUND OF THE DISCLOSURE

1. Field of the Disclosure

The disclosure relates in general to an apparatus and a method for image processing.

2. Description of the Related Art

Current photosensitive elements include, for examples, digital charge-coupled device (CCD) or complementary metal-oxide-semiconductor (CMOS) sensors. A saturation level, or full well level, of a photosensitive element usually is designed as one within the operation range of an analog to digital converter. As such, when the analog to digital converter uses a minimal analog gain, the saturation level of a photosensitive element has a clamp point in the operation range. Digital image processing of pixel data usually introduces color distortion or noise of high luminance. In this situation, a higher analog gain can be used such that the saturation level has a clamp point outside the operation range of the analog to digital converter, thereby improving image defects. However, the usage of a higher analog gain decreases the dynamic range of the image, and causes increased noise.

SUMMARY OF THE DISCLOSURE

The disclosure is directed to an image processing apparatus and an image processing method which can improve the dynamic range of images.

According to an aspect of the present disclosure, an image processing apparatus is provided. The image processing apparatus includes a sample unit, an amplifier, an analog to digital converter, and a white balance unit. The sample unit is for sampling a pixel to obtain a pixel voltage. The amplifier is for amplifying the pixel voltage according to an analog gain. The analog to digital converter is for converting the amplified pixel voltage into digital pixel data. The digital pixel data includes a number of first sub-pixel data which are corresponding to different colors. The white balance unit is for obtaining a number of second sub-pixel data from white balance compensating the first sub-pixel data. The first sub-pixel data can be white balance compensated respectively according to the analog gain and a number of white balance gains which are corresponding to different sub-pixels.

According to another aspect of the present disclosure, an image processing method is provided. The image processing method includes a number of steps. A pixel is sampled to obtain a pixel voltage. The pixel voltage is amplified according to an analog gain. The amplified pixel voltage is converted into digital pixel data, the digital pixel data including a number of first sub-pixel data which are corresponding to different colors. A number of second sub-pixel data is obtained from white balance compensating the first sub-pixel data. The first sub-pixel data are white balance compensated respectively according to the analog gain and a number of white balance gains which are corresponding to different sub-pixels.

The above and other aspects of the disclosure will become better understood with regard to the following detailed description of the preferred but non-limiting embodiment(s). The following description is made with reference to the accompanying drawings.

DETAILED DESCRIPTION OF THE DISCLOSURE

The image processing apparatus and the image processing method described in this disclosure can improve the dynamic range of images, and be used in applications for noise reduction.

In this disclosure, an image processing apparatus is provided. The image processing apparatus can include a sample unit, an amplifier, an analog to digital converter, and a white balance unit. The sample unit is for sampling a pixel to obtain a pixel voltage. The amplifier is for amplifying the pixel voltage according to an analog gain. The analog to digital converter is for converting the amplified pixel voltage into digital pixel data. The digital pixel data includes a number of first sub-pixel data which are corresponding to different colors. The white balance unit is for obtaining a number of second sub-pixel data from white balance compensating the first sub-pixel data. The first sub-pixel data can be white balance compensated respectively according to the analog gain and a number of white balance gains which are corresponding to different sub-pixels.

In the course of providing the second sub-pixel data, the white balance unit can provide a number of third sub-pixel data according to the first sub-pixel data and the white balance gains, then determine whether to clamp the third sub-pixel data according to the analog gain and a full well level of the pixel so as to provide the second sub-pixel data.

Figure 1:
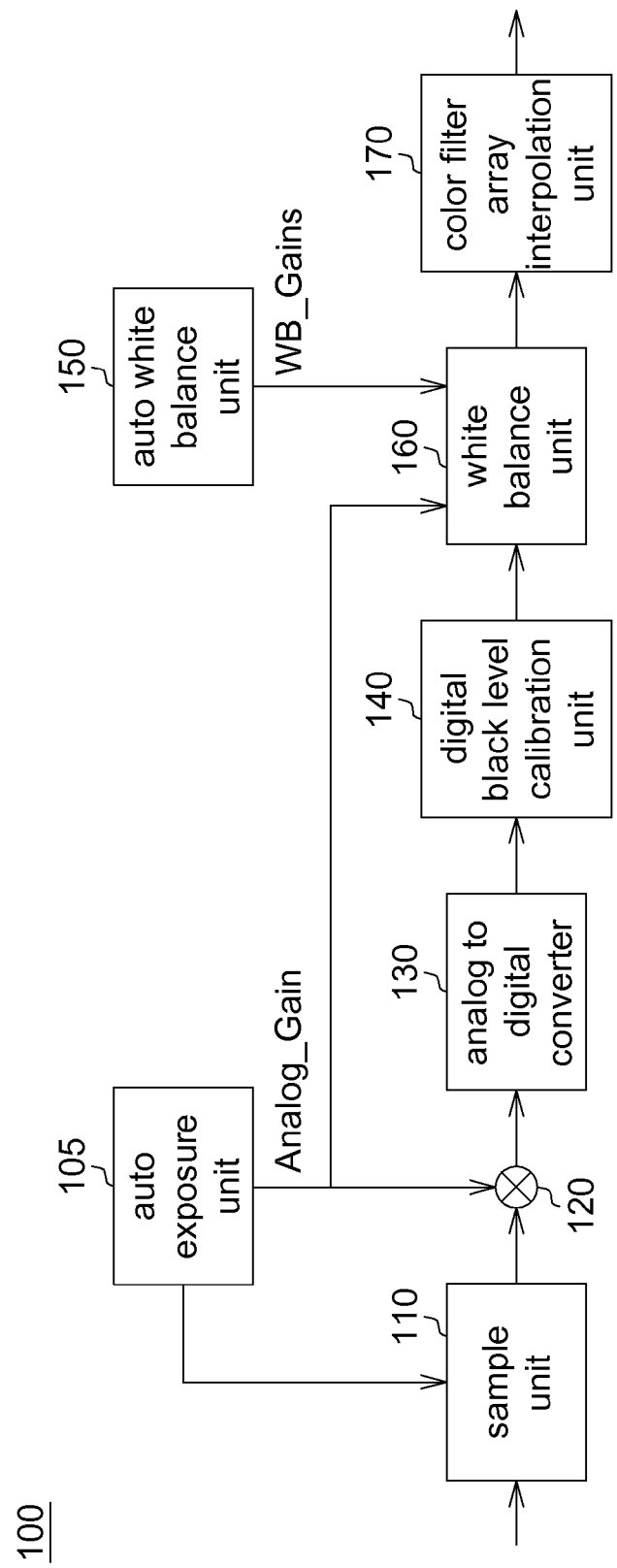
FIG. 1 is a block diagram showing the image processing apparatus according to an exemplary embodiment.

FIG. 1 is a block diagram showing the image processing apparatus according to an exemplary embodiment. Referring to FIG. 1, the image processing apparatus 100 includes an auto exposure unit 105, a sample unit 110, an amplifier 120, an analog to digital converter 130, a digital black level calibration unit 140, an auto white balance unit 150, a white balance unit 160, and a color filter array interpolation unit 170. The sample unit 110, the amplifier 120, and the analog to digital converter 130 may integrated into an image sensor, and the image sensor can further include or be externally coupled to a photosensitive element such as an element based on Charge-coupled Device (CCD) or complementary metal oxide semiconductor (CMOS) which provides the sample unit 110 with image input signal. Besides, the digital black level calibration unit 140, the white balance unit 160, and the color filter array interpolation unit 170 can be for example integrated into an image processor, but this disclosure is not limited thereto. Besides, the image processor can further include one or more units or circuits for color correction, Gamma correction, and/or image enhancement.

The auto exposure unit 105 controls the sample unit 110 to sample a pixel and obtain a pixel voltage. The auto exposure unit 105 provides an analog gain Analog_Gain to the amplifier 120, and the amplifier 120 amplifies the pixel voltage according to the analog gain Analog_Gain. The analog to digital converter 130 converts the amplified pixel voltage into a digital pixel data, the digital pixel data includes a number of first sub-pixel data which are corresponding to different colors, such as red sub-pixel data R, green sub-pixel data Gr/Gb, and blue sub-pixel data B. The digital black level calibration unit 140 is coupled between the analog to digital converter 130 and the white balance unit 160, and is for performing black level calibration of the digital pixel data.

The auto exposure unit 105 provides analog gain Analog_Gain for the white balance unit 160. Meanwhile, the auto white balance unit 150 provides a number of white balance gains WB_Gains which are corresponding to different sub-pixels for the white balance unit 160. The white balance gains WB_Gains include for example a white balance gain WB_R_Gain corresponding to the red sub-pixel data R, a white balance gain WB_Gr_Gain/WB_Gb_Gain corresponding to the green sub-pixel data Gr/Gb, and a white balance gain WB_B_Gain corresponding to the blue sub-pixel data. The white balance unit 160 performs white balance compensation on the first sub-pixel data according to the analog_Gain provided by the auto exposure unit 105 and the white balance gains WB_Gains provided by the auto white balance unit 150, respectively, so as to obtain a number of second sub-pixel data. The white balance unit 160 provides an RAW image data which can include the second sub-pixel data to the white balance unit 160. The color filter array interpolation unit 170 obtains a tri-primary color image data such as an RGB image from interpolating the RAW image data provided by the white balance unit 160.

Figure 2:
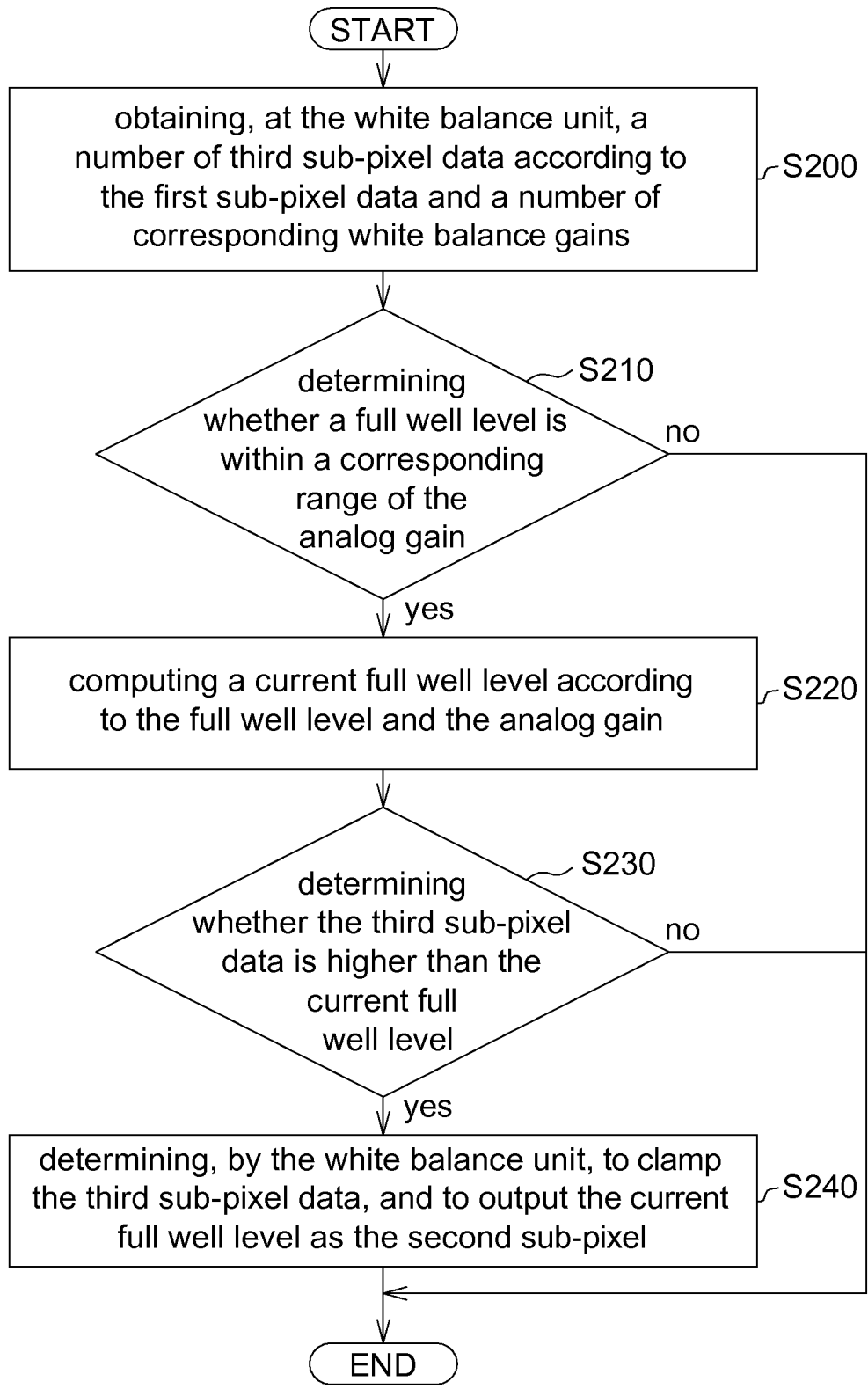
FIG. 2 is a flow chart showing the white balance unit performs exposure extension according to an exemplary embodiment.

FIG. 2 is a flow chart showing how the white balance unit performs exposure extension according to an exemplary embodiment. The exemplary embodiment can be used in the white balance unit 160 of FIG. 1 for performing the white balance compensation. Refer to FIG. 2. In step S200, the white balance unit 160 obtains a number of third sub-pixel data according to the first sub-pixel data and a number of corresponding white balance gains WB_Gains. Exemplarily, the white balance unit 160 computes multiplication of the first sub-pixel data and the white balance gains WB_Gains respectively, and serves the multiplication result as the third sub-pixel data. For example, the multiplication of a red sub-pixel data R and a white balance gain WB_R_Gain can be served as a third sub-pixel data R', the multiplication of a green sub-pixel data Gr/Gb and a white balance gain WB_Gr_Gain/WB_Gb_Gain can be served as a third sub-pixel data Gr'/Gb', and the multiplication of a blue sub-pixel data B and a white balance gain WB_B_Gain can be served as a third sub-pixel data B'.

In step S210, the white balance unit 160 determines whether a full well level of the pixel is within a corresponding range of the analog gain Analog_Gain. The range can be obtained from the analog gain Analog_Gain and a bit number of the analog to digital converter 130. For example, the range can be between a digital pixel data obtained when the analog gain Analog_Gain is 1 and a maximum digital pixel data $2^n$ of an n-bit analog to digital converter 130. When the full well level is determined not to be within the range, the procedure can be ended. In other words, the white balance unit 160 does not clamp the third sub-pixel data, and can provide the third sub-pixel data as the second sub-pixel data.

On the other hand, when the full well level is determined to be within the range, steps S220 and S230 are executed sequentially. In the step S220, the white balance unit 160 computes a current full well level according to the full well level and the analog gain Analog_Gain. Exemplarily, the white balance unit 160 can compute multiplication of the analog gain Analog_Gain and the full well level, and serve the multiplication result as the current full well level. Further, the white balance unit 160 can limit the current full well level to a number of $2^{n-1}$ where n is the bit number of the pixel. In other words, when the multiplication result of the analog gain Analog_Gain and the full well level is higher than $2^{n-1}$, the current full well level can be substantially equal to $2^{n-1}$.

In step S230, the white balance unit 160 compares each of the third sub-pixel data with the current full well level, so as to determine whether each of the third sub-pixel data is higher than the current full well level respectively. When the determination result of the step S230 is false, the procedure is ended. In other words, the white balance unit 160 does not clamp sub-pixel data, and can provide the third sub-pixel data as the second sub-pixel data. On the other hand, when the determination result of step S230 is true, the step S240 is executed. In step S240, the white balance unit 160 can clamp the third sub-pixel data higher than the current full well level, and for example, output the current full well level as the second sub-pixel correspondingly.

For further illustration, when the third sub-pixel R' is determined to be higher than the current full well level, a corresponding second sub-pixel data can be equal to the current full well level. On the other hand, when the third sub-pixel R' is determined not to be higher than the current full well level, the corresponding second sub-pixel data can be equal to the third sub-pixel data R'. Analogically, when the third sub-pixel Gr'/Gb' is determined to be higher than the current full well level, a corresponding second sub-pixel data can be equal to the current full well level. On the other hand, when the third sub-pixel Gr'/Gb' is determined not to be higher than the current full well level, the corresponding second sub-pixel data can be equal to the third sub-pixel data Gr'/Gb'. Analogically, when the third sub-pixel B' is determined to be higher than the current full well level, a corresponding second sub-pixel data can be equal to the current full well level. On the other hand, when the third sub-pixel B' is determined not to be higher than the current full well level, the corresponding second sub-pixel data can be equal to the third sub-pixel data B'.

Figure 3:
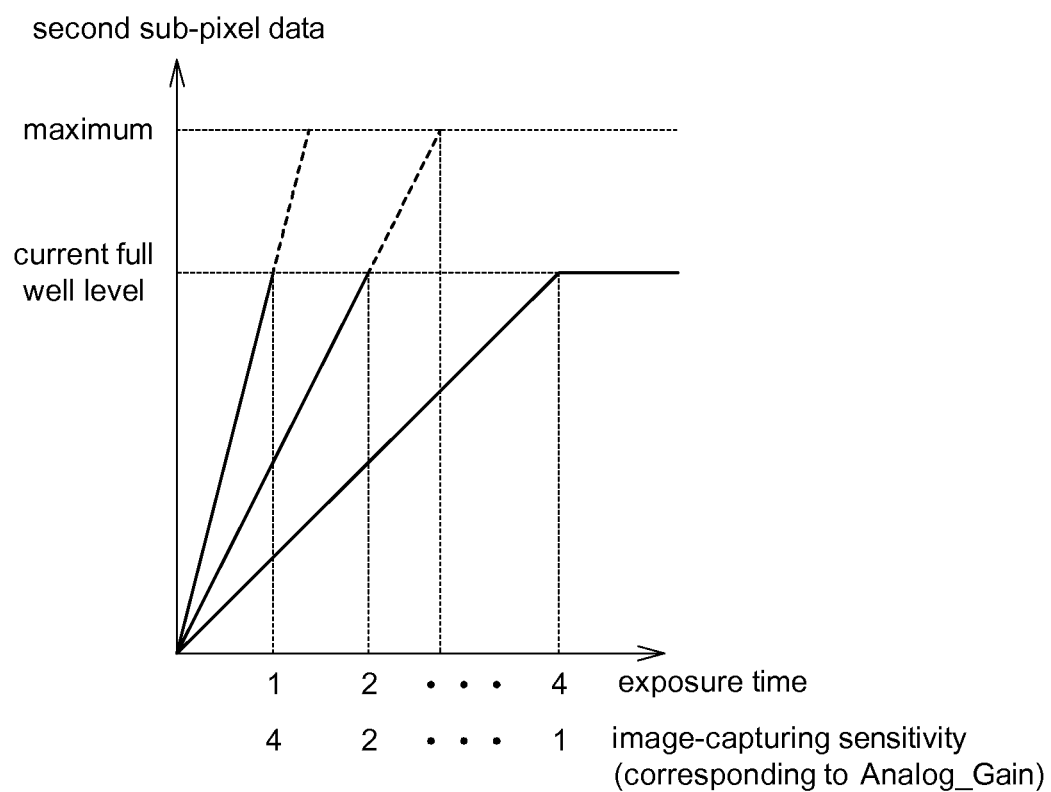
FIG. 3 is a schematic diagram showing the relationship between the second sub-pixel data and the exposure time/image-capturing sensitivity.

As is described in the disclosed embodiments, the second sub-pixel data can be clamped at or limited to the current full well level. FIG. 3 is a schematic diagram showing the relationship between the second sub-pixel data and the exposure time/image-capturing sensitivity. As can be seen from FIG. 3, when the image processing apparatus uses a high image-capturing sensitivity, i.e., a high analog gain Analog_Gain is used, the second sub-pixel is clamped at or limited to the current full well level. Therefore, color distortion or noise of high luminance resulting from use of a high analog gain Analog_Gain can be reduced.

According to embodiments of the present disclosure, an image processing method is provided. The image processing method includes a number of steps as follows. A pixel is sampled to obtain a pixel voltage. The pixel voltage is amplified according to an analog gain. The amplified pixel voltage is converted into digital pixel data, the digital pixel data including a number of first sub-pixel data which are corresponding to different colors. A number of second sub-pixel data is obtained from white balance compensating the first sub-pixel data. The first sub-pixel data are white balance compensated respectively according to the analog gain and a number of white balance gains which are corresponding to different sub-pixels. As for the image processing method, its operation, thus, can be derived similarly with reference to the above-related description of image processing apparatus 100 and will not be specified for the sake of brevity.

According to the disclosed embodiments of the image processing apparatus and the image processing method, white balance compensation on pixel data can be performed according to an analog gain and a white balance gain. In addition, the comparison result between a current full well level and the pixel data can be used to determine whether to clamp the pixel data or not. Thus, color distortion or noise of high luminance can be reduced. Therefore, the disclosure can improve the dynamic range of images, be used in applications which require reduced noise, and provide increased image quality.

While the disclosure has been described by way of example and in terms of the preferred embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image processing apparatus, comprising:
   a sample unit for sampling a pixel to obtain a pixel voltage;
   an amplifier for amplifying the pixel voltage according to an analog gain;
   an analog to digital converter for converting the amplified pixel voltage into digital pixel data, the digital pixel data including a plurality of first sub-pixel data which are corresponding to different colors; and
   a white balance unit for obtaining a plurality of second sub-pixel data from white balance compensating the first sub-pixel data, the first sub-pixel data being white balance compensated respectively according to the analog gain and a plurality of white balance gains which correspond to different sub-pixels;
   wherein the white balance unit provides a plurality of third sub-pixel data according to the first sub-pixel data and the white balance gains, and determines, according to the analog gain and a full well level of the pixel, whether to clamp the third sub-pixel data so as to provide the second sub-pixel data.

2. The image processing apparatus according to claim 1, wherein the white balance unit computes multiplication of the white balance gains and the first sub-pixel data respectively, and serves the multiplication result as the third sub-pixel data.

3. The image processing apparatus according to claim 1, wherein the white balance unit determines whether the full well level is within a corresponding range of the analog gain, computes a current full well level when the full well level is determined to be within the range, compares each third sub-pixel data with the current full well level, and bases on the comparison result to determine whether to clamp the third sub-pixel data so as to provide the second sub-pixel data, wherein the range is obtained from the analog gain and a bit number of the analog to digital converter.

4. The image processing apparatus according to claim 3, wherein when the full well level is determined not to be within the range, the white balance unit determines not to clamp the third sub-pixel data.

5. The image processing apparatus according to claim 3, wherein the white balance unit computes multiplication of the analog gain and the full well level, and serves the multiplication result as the current full well level.

6. The image processing apparatus according to claim 5, wherein the white balance unit further limits the current full well level to a number of $2(n-1)$ where n is the bit number of the pixel.

7. The image processing apparatus according to claim 3, wherein the white balance unit further determines whether the third sub-pixel data is higher than the current full well level, when the third sub-pixel data is determined to be higher than the current full well level the white balance unit determines to clamp the third sub-pixel data, when the third sub-pixel data is determined not to be higher than the current full well level the white balance unit determines not to clamp the third sub-pixel data.

8. The image processing apparatus according to claim 3, wherein when the white balance unit determines to clamp the third sub-pixel data, the white balance unit provides the current full well level and serves the current full well level as the second sub-pixel data, when the white balance determines not to clamp the third sub-pixel data, the white balance unit provides the third sub-pixel data and serves the third sub-pixel data as the second sub-pixel data.

9. The image processing apparatus according to claim 1 further comprises:
   an auto exposure unit for controlling the sample unit and, the auto exposure unit further for providing the amplifier and the white balance unit with the analog gain.

10. The image processing apparatus according to claim 1 further comprises:
    an auto white balance unit for providing the white balance unit with the white balance gains.

11. The image processing apparatus according to claim 1 further comprises:
    a digital black level calibration unit coupled between the analog to the digital converter and the white balance unit, the digital black level calibration unit for performing black level calibration of the digital pixel data.

12. The image processing apparatus according to claim 1 further comprises:
    a color filter array interpolation unit for obtaining a tri-primary color image data from interpolating an RAW image data output from the white balance unit, wherein the RAW image data include the second sub-pixel data.

13. An image processing method, comprising:
    (i) sampling a pixel to obtain a pixel voltage;
    (ii) amplifying the pixel voltage according to an analog gain;
    (iii) converting the amplified pixel voltage into digital pixel data, the digital pixel data including a plurality of first sub-pixel data which are corresponding to different colors; and
    (iv) obtaining a plurality of second sub-pixel data from white balance compensating the first sub-pixel data, wherein the first sub-pixel data are white balance compensated respectively according to the analog gain and a plurality of white balance gains which correspond to different sub-pixels;
    wherein the step (iv) comprises:
      (a) providing, according to the first sub-pixel data and the white balance gains, a plurality of third sub-pixel data; and
      (b) determining, according to the analog gain and a full well level of the pixel, whether to clamp the third sub-pixel data so as to provide the second sub-pixel data.

14. The image processing method according to claim 13, wherein the step (a) comprises computing multiplication of the white balance gains and the first sub-pixel data respectively, and serving the multiplication result as the third sub-pixel data.

15. The image processing method according to claim 13, wherein the step (b) comprises:
    (b1) determining whether the full well level is within a corresponding range of the analog gain;
    (b2) computing, when the full well level is determined to be within the range, a current full well level according to the full well level and the analog gain; and (b3) comparing each third sub-pixel data with the current full well level, and basing on the comparison result to determine whether to clamp the third sub-pixel data so as to provide the second sub-pixel data.

16. The image processing method according to claim 15, wherein the step (b3) comprises:
determining, when the full well level is determined not to be within the range, not to clamp the third sub-pixel data.

17. The image processing method according to claim 15, wherein the step (b2) comprises:
computing multiplication of the analog gain and the full well level, and serving the multiplication result as the current full well level.

18. The image processing method according to claim 17 further comprises:
limiting the current full well level to a number of 2(n−1) where n is the bit number of the pixel.

19. The image processing method according to claim 15, wherein the step (b3) comprises:
determining whether the third sub-pixel data is higher than the current full well level; and
determining to clamp the third sub-pixel data when the third sub-pixel data is determined to be higher than the current full well level, determining not to clamp the third sub-pixel data when the third sub-pixel data is determined not to be higher than the current full well level.

20. The image processing method according to claim 15, wherein when the third sub-pixel data are clamped the current full well level is provided and served as the second sub-pixel data, when the third sub-pixel data are not clamped the third sub-pixel data are provided and served as the second sub-pixel data.

21. An image processing apparatus, comprising: a white balance unit configured to:
obtain a plurality of third sub-pixel data according to a plurality of first sub-pixel data and a plurality of white balance gains which correspond to different sub-pixel data, wherein the plurality of first sub-pixel data are with respect to a pixel and are digital pixel data;
determine whether a full well level of the pixel is within a range corresponding to an analog gain;
compute a current full well level according to the full well level and the analog gain, if the full well level is determined to be within the range corresponding to the analog gain;
compare each third sub-pixel data with the current full well level; and
determine, based on each comparison result, whether to clamp the third sub-pixel data so as to provide a second sub-pixel data.

22. The image processing apparatus according to claim 21, wherein when the white balance unit determines to clamp the third sub-pixel data, the white balance unit provides the current full well level and serves the current full well level as the second sub-pixel data, and when the white balance determines not to clamp the third sub-pixel data, the white balance unit provides the third sub-pixel data and serves the third sub-pixel data as the second sub-pixel data.

23. The image processing apparatus according to claim 21, wherein the white balance unit further determines whether the third sub-pixel data is higher than the current full well level; when the third sub-pixel data is determined to be higher than the current full well level, the white balance unit determines to clamp the third sub-pixel data; and when the third sub-pixel data is determined not to be higher than the current full well level, the white balance unit determines not to clamp the third sub-pixel data.

24. The image processing apparatus according to claim 21, wherein the white balance unit is further configured to determine not to clamp the third sub-pixel data, if the full well level is determined not to be within the range.

25. The image processing apparatus according to claim 21, wherein the white balance unit further limits the current full well level to a number of 2(n-1) where n is the bit number of the pixel.

26. The image processing apparatus according to claim 21, further comprises:
a sample unit for sampling the pixel to obtain a pixel voltage;
an amplifier for amplifying the pixel voltage according to the analog gain; and
an analog to digital converter for converting the amplified pixel voltage into digital pixel data which includes the plurality of first sub-pixel data corresponding to different colors.

27. The image processing apparatus according to claim 21, further comprising at least one of the following:
an auto exposure unit for controlling the sample unit and providing the amplifier and the white balance unit with the analog gain;
an auto white balance unit for providing the white balance unit with the plurality of white balance gains which correspond to different first sub-pixel data;
a digital black level calibration unit coupled between the analog to the digital converter and the white balance unit, for performing black level calibration of the digital pixel data; and
a color filter array interpolation unit for obtaining a tri-primary color image data from interpolating an RAW image data output from the white balance unit, wherein the RAW image data include the second sub-pixel data.

28. An image processing method, comprising:
obtaining a plurality of third sub-pixel data according to a plurality of first sub-pixel data and a plurality of white balance gains which correspond to different sub-pixel data, wherein the plurality of first sub-pixel data are with respect to a pixel and are digital pixel data; and
determining, according to an analog gain and a full well level of the pixel, whether to clamp the plurality of third sub-pixel data respectively so as to provide a second sub-pixel data.

29. The image processing method according to claim 28, wherein the step of determining whether to clamp the plurality of third sub-pixel data respectively so as to provide the second sub-pixel data comprises:
determining whether the full well level of the pixel is within a range corresponding to the analog gain;
computing a current full well level according to the full well level and the analog gain, if the full well level is determined to be within the range corresponding to the analog gain;
comparing each third sub-pixel data with the current full well level; and
determining, based on each comparison result, whether to clamp the third sub-pixel data according to the current full well level so as to provide the second sub-pixel data.

30. The image processing method according to claim 29, wherein the step of determining whether to clamp the plurality of third sub-pixel data respectively so as to provide the second sub-pixel data further comprises:
determining, if the full well level is determined not to be within the range, not to clamp the third sub-pixel data so as to serve the third sub-pixel data as the second sub-pixel data.

31. The image processing method according to claim 29, wherein the step of comparing each third sub-pixel data and the step of determining whether to clamp the third sub-pixel data comprises:
  determining whether the third sub-pixel data is higher than the current full well level;
  determining to clamp the third sub-pixel data when the third sub-pixel data is determined to be higher than the current full well level; and
  determining not to clamp the third sub-pixel data when the third sub-pixel data is determined not to be higher than the current full well level.

32. The image processing method according to claim 28, wherein the step of determining whether to clamp the plurality of third sub-pixel data respectively so as to provide the second sub-pixel data further comprises:
  when the third sub-pixel data are clamped, serving the current full well level as the second sub-pixel data; and
  when the third sub-pixel data are not clamped, serving the third sub-pixel data as the second sub-pixel data.

33. The image processing method according to claim 28, wherein the current full well level is limited to a number of 2(n-1) where n is the bit number of the pixel.

34. The image processing method according to claim 28, further comprising:
  sampling the pixel to obtain a pixel voltage;
  amplifying the pixel voltage according to the analog gain; and
  converting the amplified pixel voltage into digital pixel data which includes the plurality of first sub-pixel data corresponding to different colors.

* * * * *